US006455089B1

(12) United States Patent
Kalnish et al.

(10) Patent No.: US 6,455,089 B1
(45) Date of Patent: Sep. 24, 2002

(54) METHOD FOR PRODUCING MACARONI-TYPE ARTICLES

(75) Inventors: Grigory Izeslavovich Kalnish, Molodyezchnly Bulvar, 1-174, Tver (RU), 170000; Vladimir Mikhailovich Antonov, Krasnoyarsk (RU); Sergei Stepanovich Potapov, Tver (RU); Sergel Mikhailovich Smirnov, Tver (RU)

(73) Assignee: Grigory Izeslavovich Kalnish, Molodezhny bulvar (RU)

( * ) Notice: Subject to any disclaimer, the term of this patent is extended or adjusted under 35 U.S.C. 154(b) by 0 days.

(21) Appl. No.: 09/554,357

(22) PCT Filed: Nov. 16, 1998

(86) PCT No.: PCT/RU98/00382

§ 371 (c)(1),
(2), (4) Date: Jul. 23, 2001

(87) PCT Pub. No.: WO00/15046

PCT Pub. Date: Mar. 23, 2000

(30) Foreign Application Priority Data

Sep. 17, 1998 (RU) .......................................... 98117113

(51) Int. Cl.$^{7}$ .................................................. A23L 1/16
(52) U.S. Cl. ....................................... 426/557; 426/451
(58) Field of Search ................................ 426/451, 557, 426/506, 507

(56) References Cited

U.S. PATENT DOCUMENTS 4,000,330 A 12/1976 Sipos et al.
5,298,274 A * 3/1994 Khalsa ....................... 426/808
5,395,639 A * 3/1995 Chawan et al. ............. 426/557

FOREIGN PATENT DOCUMENTS

| | | |
|---|---|---|
| GB | 1182510 | 2/1970 |
| RU | 2083116 | 7/1997 |
| SU | 1593559 | 9/1990 |
| SU | 1837778 | 6/1991 |
| SU | 1837779 | 8/1993 |

OTHER PUBLICATIONS

"Preparation of the macaroni dough", *Technology and Equipment for Food Manufacture*, edited by N.I. Nazarov, p. 214 (1977).

* cited by examiner

*Primary Examiner*—Lien Tran
(74) *Attorney, Agent, or Firm*—Frishauf, Holtz, Goodman & Chick, P.C.

(57) ABSTRACT

A method that first involves steeping whole wheat grains in water until the shoots appear, percolating the water not bound by the grains and grinding the grains in order to obtain an aqueous suspension of a grain mass having a particle size not exceeding 500 $\mu$m. The steeping process of the wheat flour is carried out using the water from the suspension of the grain mass by gradually pouring the wheat flour into the water during the dough mixing process. Before the grinding step, the wheat grains can be optionally rinsed with water and separated from the rinsing water by the free flow thereof. The wheat may consist of food-grade wheat of the hard or soft types, while the wheat flour may consist of a macaroni or baking flour having a humidity not exceeding 14.5%, a whiteness of at least 42 specific units and a gluten content of at least 28%.

12 Claims, No Drawings

METHOD FOR PRODUCING MACARONI-TYPE ARTICLES

TECHNICAL FIELD

The present invention relates to the food industry, and more specifically to a manufacturing of macaroni type products; it may be used for production of the macaroni products with increased biological qualitative indices from the wheat, including one of a soft type.

BACKGROUND ART

There is a known method of bakery products manufacturing (e.g. vermicelli) which involves mixing up wheat flour, maize flour which has at least 95 per cent concentration of amilopektine, water and special ingredients as prescribed by a recipe; forming the paste and baking and/or drying up of the end product (Patent USSR No. 1593559, Int. CI. A 21 D 13/04, 1990-).

The most similar by the technical characteristics method of production to the present one is the method of the macaroni manufacturing which involves soaking the wheat flour and special ingredients, as prescribed by a recipe, mixing up the pastry of prescribed consistency, which is separated into forms with consequent drying up process (NAZAROV, N, 'Technology and Equipment for the Food Industry', Food Industry Press, Moscow, 1977 pp. 214).

The drawback of the above captured macaroni production method is that the end product is in low biological qualitative indices and relatively high cost of production; that is due to the fact that on one hand the flour, even if produced by modem, state of the art technology, still lacks (or consists of in very small amount) vital components such as aminoacids, vitamins and food fibre; on the other hand with increasing quality of the flour its cost rises, whereas the biological qualitative indices of the end product decreases.

DISCLOSURE OF THE INVENTION

The invention resolves the problem of the widening of the macaroni product assortment with increased food value and decreased cost of production Generally products manufactured from the flout of top quality (which is usually used for manufacturing of macaroni) are of low food value and biological qualitative indices. That type of flour has the lowest amount of vitamins, minerals, food fibre; all of them being vital element of nourishment. That is why among specialist on nutrition and medical community there is an appreciation of the inventing of a technology allowing for manufacturing of an end macaroni product comprising of all food value components of the wheat grain. Moreover, in the traditional macaroni manufacturing method a special sort of flour is to be used, which is produced from hard types of wheat; which is cultivated only in particular geographical locations (e.g. Canada). Substituting the hard wheat flour with a more commonly available soft wheat flour leads to drastically reduced quality of the end product.

The technical result of the herein captured invention is manufacturing of macaroni and macaroni related products with increased food value and decreased cost, as well as allowing for using of new raw materials in macaroni manufacturing process.

The above captured technical result is achieved by the following method—soaked wheat paste together with flour is used to mix up a pastry, which is formed and consequently dried up. Grain seeds are soaked until the process of the germ growing starts; the water is than filtered; grain seeds are pulverized until a grain paste is achieved characterized by grain seeds parts of no more then 500 mkm. Consequently the wheat flour is mixed up with the grain paste, by gradual adding wheat to the paste, and the pastry is mixed up.

Both hard and soft type of wheat grain can be used.

The wheat flour used should be bakery flour with moisture level of no more then 14.5%, whiteness of no less than 42 units, and gluten level of no less 28% and/or macaroni flour.

The invention also involves pulverized grain seeds being additionally rinsed by clean water, which is consequently filtered through using a sieve.

This method of macaroni manufacturing is different in that before mixing up with flour grain seeds are soaked in the duration of time required for the germ growing process to start; the water is than removed; the grain seeds pulverized until water-grain paste is made with the size of grain parts of no more than 500 mkm.

The invented method is also different in that in the process of mixing up the pastry ONLY wheat flour and the water-grain paste are used, whereas flour is added to the water-grain paste.

It is further different in that wheat used can be traditionally used hard wheat or ultra-hyaline wheat, as well as widely available soft wheat, which has not been traditionally used in macaroni manufacturing.

It is further different in that flour used can be traditionally used macaroni flour, as well as ordinary baking flour with humidity of no more than 14.5%, whiteness of no more than 42 units and gluten level of no less than 28%.

It is further different in that the grain seeds are first rinsed, than the water is removed, and only than the grain is pulverized.

Usage of the pulverized grain seeds has allowed to enrich the end product with the following food valuable components of the grain: amino-acids, vitamins, micro-elements and food fibre. Moreover proportion of those components is naturally balanced, and corresponds to the stage when the grain germ starts to grow. The late factors ensures biological qualitative indices of the end product.

The biological qualitative indices is further increased by inventing of the 'grain-friendly' technology for grain processing, whereas grain seeds are soaked in water until the stage of the grain germ growing starts. Consequently the soaked grain is dispersed (for example using the dispergator equipment), until consistence of the grain paste of no more then 500 mkm That ensures that all vital food valuable components are preserved. Moreover, grain seeds in the germ growing stage are characterized by the process of activation of ferments; that further enhance food quality of macaroni.

In comparison with traditional macaroni manufacturing methods, which involve mixing up strictly measured amount water and flour, the herein captured method of macaroni manufacturing does not involve strict guidelines, as the grain seed absorb the optimal amount of water. The consequent pulverization of the grain allows to obtain the required amount of water in the grain paste. Under the herein method of macaroni manufacturing the water is in the form of hydrozole, with dissolved food valuable components, such as sugar, amino-acids, some food fibre, pectine, mineral salts, etc. That further enhance the biological qualitative indices of the end macaroni product.

On the other hand using the grain seeds allows to substitute more than 50 per cent of flour. That decreases the cost of production of macaroni. The above effect results from the fact that flour is expensive to produce, moreover the better the quality of flour the higher the cost of production and consequently its price are. The decreased cost is also enhanced by the fact that highly priced hard and ultra-hyaline sorts of the wheat can be partially or fully substituted by widely available and less expensive soft wheat.

Moreover, using the ordinary wheat (with humidity of no more than 14.5%, whiteness of no less than 42 units, and gluten level of no less than 28%) instead or alongside the macaroni bakery wheat farther decreases the cost of production.

At the same time using the water-grain paste, prepared from the grain seed, farther allows to enrich the raw materials base that can be used in the macaroni manufacturing process. The herein described method of macaroni manufacturing allows to ordinary bakery wheat (of both hard and soft sorts), which had not previously been used.

The research on traditional macaroni manufacturing methods has shown that there has not previously been method of macaroni manufacturing that allows for the usage of wheat seeds, as described in this method, namely grain seeds are soaked until the process of the germ growing starts; the water is than filtered; the grain seeds are pulverised until a grain paste is achieved characterized by grain seeds parts of no more then 500 mkm Consequently the wheat flour is mixed up with the water-grain paste, by gradual adding of the wheat to the paste, and the pastry is mixed up.

There is a known method of bread manufacturing (RU patents No. 1837778 and No. 1837779) which also involves soaking the grain in water with starting temperature of 10–40 centigrade in duration of 8–20 hours until its swollen to 43% t; than it is pulverized using the matrix knife until the consistency of no more 500 mkm using dispergation equipment type TONUS'. However, those patented inventions are aimed at a different goal, namely technology for manufacturing of bread from whole grain seeds; involving quick fermenting, raising and consequently improved porosity. That all lead to decreased baking time, improved preservation period and quality.

In contrast in macaroni manufacturing process there are strict guidelines in regard of the flour. Macaroni flour is different from the bakery ordinary flour. Therefore, it is hereby claimed that the herein captured invention of the method of soaking the grain in a way that it can be used in macaroni manufacturing has new characteristics, not previously known in the bakery products manufacturing process. Among others it is the ability of the grain paste dissolved in water to prevent gluten from spreading evenly across the cut of the pastry. That characteristic had not been known in the macaroni manufacturing process before. Moreover the gluten, dissolved in water, ensures strong links in the structure in the process of mixing up the grain macaroni pastry, as the flour is mixed up purely with the water-grain paste. From the very moment of the chemical contact between the water-grain paste and the flour the process of the compounding of water and flour colloids starts.

That results in the fact that when the end product is boiled, starch is being preserved, and therefore macaroni are not boiled soft. Moreover the above described characteristics of the water-grain paste dissolved in water allows to enrich the raw materials base, namely manufacturing of macaroni from widely available ordinary flour from soft wheat sorts; which had been regarded as unusable in macaroni manufacturing; as the structure of the end product from such kind of flour was 'weak' resulting in macaroni being boiled soft. Using the herein captured method of macaroni manufacturing ensures 'strong' structure of macaroni with increased organoleptic characteristics.

MODES FOR CARRYING OUT THE INVENTION

The evidence supporting the applicability of the herein captured method of macaroni manufacturing is as following.

In the captured herein method of macaroni production not only hard sort wheat, traditionally used in macaroni manufacturing, can be used, but also ordinary soft wheat.

The method of the present invention is implemented in the following order.

The grain is cleaned from all the alien substances and mineral dust, peeled using the traditional method of the grain peeling (using peeling machine of the type UO-500), and then rinsed again. In this process it is important to ensure that only part of the grain's outer layer is removed, without damaging the grain germ.

The peeled grain is soaked in water with the starting temperature of 25–45 centigrade (depending on the air temperature under which the process of the germ growing can start). The time may vary between 8 and 20 hours. The weight of the swollen grain should increase by 40–50%.

Water is consequently removed by filtering.

The grain can be additionally rinsed with water of the air temperature, and water is again removed. The grain is consequently sieved.

The soaked grain is than put in pulverizing machine (for example dispergator type D150), where it is pulverized until a grain paste with parts of no more than 500 mkm is reached.

The final water-grain paste consist of parts of outer layer of grain, grain germ, and dissolved in water aminoacids, decsrines, fibre, pectine, mineral substances, sugar, etc.

The grain pastry mixing up process involves making the pastry of the necessary consistency (under herein described method it should be of flaky consistency) and humidity depending on the type of end product required and sort of the flour varying in the range of 28–32.5%. The flour (for example ordinary baking flour with humidity of no more than 14.5%, whiteness of no less than 42 units, and gluten level of no less than 28% or macaroni flour) is added to the grain paste; whereas the process of dissolving of the flour in the water-grain paste starts.

The 'mixing-up' term is used conventionally. In the pastry mixing up equipment (for example partially automated type RT-PM-2101) the ingredients are being mixed up only up until the consistency of flaky paste. In order to do so the flour and water-grain paste is first mixed up whereas the flour is gradually added to the water-grain paste; and than the flaky consistency paste is being thickened. In that process the structure of the pastry is formed, necessary for the consequent forming of the end product. The pastry is than placed in a matrix pulp. Consequently the pastry is pressed through the matrix, forming the required end macaroni product. The formed macaroni are being dried up, primarily involving active drying up process in a drying up equipment (for example drying oven type ASPIR 3 'FERMER'), employing traditional technology for drying up of macaroni.

EXAMPLE 1

In this example Kazakh soft wheat was used (gluten of 26%, deformation index of gluten—75 units). Ordinary baking flour was used (humidity 14.5%, whiteness of 58 units), i.e. traditional wheat flour of high quality sort.

The grain was cleaned from all the alien substances and mineral dust, peeled and then rinsed again. The peeled wheat was soaked in water with starting temperature of 42 centigrade and air temperature of 25 centigrade until the stage of the grain germ growing started. In this particular example the time was 14 hours.

As soon as the process of grain germ growing started the water was removed (by filtering the soaked grain seeds through a sieve). The grain seeds were additionally rinsed with water with the temperature of 20 centigrade, extra water was again removed. The grain seeds were put in a pulverizing machine (dispergator type D150) and were pulverized until a water-grain paste was reached with part size of 480 mkm.

In order to mix up the pastry of flaky consistency with humidity of 29 per cent a pastry making partially automated equipment type RT-PM-2101 was used. Three kg of the water-grain paste were mixed up with 1.7 kg of the ordinary flour of high quality sort. The flour was gradually added to the water-grain paste. The end pastry was of a flaky consistency, and ready for forming of macaroni products.

From the above described pastry macaroni of simple small type were formed. The weight of the formed macaroni at that stage was 4.7 kg. The formed macaroni were placed in the active drying up process in the dying up equipment of type ASPIR 3 TERMER in the duration of 45 minutes with the starting temperature of 87 centigrade with gradual decreasing to 50 centigrade. The weight of the end product was 3.43 kg. The macaroni were of yellow color, with cream shade evenly distributed along the surface. In the process of boiling up macaroni preserved their form and were not boiled soft. The taste was pleasant and was high in food value.

EXAMPLE 2

The method was implemented in the same way as in example 1, but the flour used was a mix of 65% of Kazakh soft wheat (gluten level of 26% and index of deformation of gluten—75 units) and 35% of ordinary soft flour (from Tula and Lipezk regions, with gluten level of 21–22% and index of deformation of gluten—85 units). The flour used was ordinary flour with humidity of 14.5%, whiteness of 42 units, gluten of 30%, i.e. ordinary wheat of first quality type.

In order to mix up the pastry off take consistency with humidity of 30 per cent, 3 kg of water-grain paste and 3.4 kg of the ordinary flour of the first quality sort were placed in mixing up equipment and the pastry was mixed up.

The weight of the formed macaroni was 5.4 kg. The formed macaroni were processed in the active drying up process in the duration of 50 minutes with the starting temperature of 87 centigrade with gradual decreasing to 50 centigrade. The weight of the end product was 4.1 kg. The macaroni were of yellow colour, with slight grey shade evenly distributed along the surface. In the process of boiling up macaroni preserve their form and are not boiled soft. The taste is pleasant and are high in food value.

EXAMPLE 3

The method was implemented as in example 1, however seeds of the hard wheat were used (from Orengbourg region), with fibre of 26%, index of deformation of fibre of 80 units, and hyaline level of 80%. The flour used was baking flour with humidity of 14.5%, whiteness of 58 units, fibre of 28%, i.e. the baking flour of high quality sort. In order to mix up the pastry of flake consistency with humidity of 29 per cent, 3 kg of water-grain paste and 2.5 kg of the ordinary flour of the high quality sort were placed in mixing up equipment and the pastry was mixed up. The pastry was ready for forming.

The weight of the formed macaroni was 5.5 kg. The formed macaroni were processed in the active drying up process in the duration of 50 minutes with the starting temperature of 87 centigrade with gradual decreasing to 50 centigrade. The weight of the end product was 4.2 kg. The macaroni were of light yellow colour evenly distributed along the surface. In the process of boiling up macaroni preserve their form and are not boiled soft. The taste is pleasant and are high in food value.

Therefore, it has been shown above that the herein described invention 'The method of macaroni manufacturing' can be implemented and has the following characteristics:

method described in the herein captured invention is aimed at being implemented in food industry and macaroni manufacturing in particular; it can be used for manufacturing of macaroni with increased biological qualitative indices from ordinary wheat, including widely available wheat of soft sorts;

it has been shown that the method described in the herein captured invention can be implemented using the known tools, equipment and techniques;

the method described in the herein captured invention is capable of resolving the problem and achieve the aim the inventor claims it can: the end macaroni product have the increased biological qualitative indices while decreasing the cost of production; and also widening of the assortment of the raw materials base to be used in the macaroni production. That is achieved by the fact that soft sort wheat, which had never been used in macaroni manufacturing, can now be used ensuring 'hard' structure of macaroni with high organoleptic characteristics.

What is claimed is:

1. In a method of manufacturing a macaroni product by preparing a mixture of wheat flour and water of prescribed consistency for use in forming a macaroni product, forming the macaroni product from the mixture and drying the macaroni product; the improvement comprising preparing the mixture of flour and water by the following steps:

soaking wheat grain seeds containing wheat grain seed germ until the wheat grain seed germ begins growing;

removing water not absorbed by the wheat grain seeds from the wheat grain seeds; thereafter pulverizing the wheat grain seeds, containing the wheat grain seed germ beginning to grow, to form a water-grain paste with pulverized grains of no more than 500 microns; and thereafter adding sufficient amount of the flour to the water-grain paste with mixing and moistening the flour by the water of the water-grain paste until the mixture of prescribed consistency is prepared.

2. The method according to claim 1, wherein the wheat grain seeds are the wheat grain seeds of hard and/or soft type.

3. The method according to claim 1, wherein the wheat flour has a moisture content no more than 14.5%, whiteness of no less than 42 units and gluten level of no less than 28%.

4. The method according to claim 2, wherein the wheat flour has a moisture content no more than 14.5%, whiteness of no less than 42 units and gluten level of no less than 28%.

5. The method according to claim 3, further comprising, after soaking, the additional step of rinsing the grain before removing the water by draining.

6. The method according to claim 4, further comprising, after soaking, the additional step of rinsing the grain before removing the water by draining.

7. The method of claim 1 wherein the soaking of wheat grain seeds in water is for 8–20 hours.

8. The method of claim 1 wherein the step of removing the water is by filtering.

9. The method of claim 8 wherein the soaking of wheat grain seeds in water is for 8–20 hours.

10. The method of claim 1 wherein the step of removing the water is by draining.

11. The method of claim 10 wherein the soaking of wheat grain seeds in water is for 8–20 hours.

12. A method of making a mixture of wheat flour and water of prescribed consistency for forming a macaroni product comprising the steps of:

soaking wheat grain seeds containing wheat grain seed germ until the wheat grain seed germ begins growing;

removing water not absorbed by the wheat grain seeds from the wheat grain seeds; thereafter pulverizing the wheat grain seeds, containing the wheat grain seed germ beginning to grow, to form a water-grain paste with pulverized grains of no more than 500 microns; and thereafter adding sufficient amount of the flour to the water-grain paste with mixing and moistening the flour by the water of the water-grain paste until the mixture of prescribed consistency is prepared.

* * * * *